UNITED STATES PATENT OFFICE

JOHN S. CARROLL, OF COVINGTON, GEORGIA, ASSIGNOR TO HIMSELF AND J. W. ROGERS, OF SAME PLACE.

IMPROVEMENT IN FIRE-KINDLING COMPOUNDS.

Specification forming part of Letters Patent No. 131,997, dated October 8, 1872.

*To all whom it may concern:*

Be it known that I, JOHN S. CARROLL, of Covington, in the county of Newton and State of Georgia, have invented a new and Improved Kindling Compound, of which the following is a specification:

This invention relates to a new composition which is to be applied to wood, coal, or other devices to be ignited, and which can also be used for illuminating purposes on torches or similar articles.

The invention consists in combining the following ingredients in the proportions set forth: One pound plaster of Paris; one ounce lard or swine oil; seven ounces kerosene oil; one-sixteenth of an ounce of Spanish-brown or other coloring matter. All these ingredients are well mixed together, and then ready for use. The kerosene oil makes the compound easy to ignite. The lard or swine oil adds substance to the kerosene and prevents its too rapid evaporation, serving also to keep the compound longer burning when once ignited. The plaster of Paris gives body to the entire compound and prevents it from flowing too easily. In place of the swine oil some other fatty animal substance may be used, and in place of the plaster of Paris other body-giving matter.

Having thus described my invention, I claim as new and desire to secure by Letters Patent—

The igniting compound herein described.

JOHN S. CARROLL.

Witnesses:
   S. H. LINDSAY,
   L. L. MIDDLEBROOK,
   JAMES DeLANEY.